(12) United States Patent
Schauer et al.

(10) Patent No.: US 8,607,951 B2
(45) Date of Patent: Dec. 17, 2013

(54) SYNCHRONIZER HUB

(75) Inventors: Manfred Schauer, Westendorf (DE); Michael Koelzer, Rosshaupten (DE); Robert Notz, Schongau (DE); Peter Echtler, Schongau (DE); Markus Sauter, Fuchstal-Leeder (DE)

(73) Assignee: Hoerbiger Antriebtechnik Holding GmbH, Schongau (DE)

( * ) Notice: Subject to any disclaimer, the term of this patent is extended or adjusted under 35 U.S.C. 154(b) by 115 days.

(21) Appl. No.: 13/140,067

(22) PCT Filed: Oct. 29, 2009

(86) PCT No.: PCT/EP2009/007749
§ 371 (c)(1), (2), (4) Date: Aug. 1, 2011

(87) PCT Pub. No.: WO2010/049154
PCT Pub. Date: May 6, 2010

(65) Prior Publication Data
US 2011/0277572 A1 Nov. 17, 2011

(30) Foreign Application Priority Data
Oct. 29, 2008 (EP) .................................. 08018880

(51) Int. Cl.
*F16D 23/06* (2006.01)

(52) U.S. Cl.
USPC ............................ 192/53.34; 74/438; 74/339

(58) Field of Classification Search
USPC .............................. 192/53.341, 53.342, 53.35
See application file for complete search history.

(56) References Cited

U.S. PATENT DOCUMENTS

| 2,380,559 | A | * | 7/1945 | Tyken | 192/53.34 |
| 3,563,353 | A | * | 2/1971 | LoPresti et al. | 192/21 |
| 5,054,335 | A | * | 10/1991 | Andrews | 74/665 GA |
| 5,113,986 | A | * | 5/1992 | Frost | 192/53.341 |
| 5,449,306 | A | * | 9/1995 | Nakayasu et al. | 440/75 |
| 6,109,128 | A | * | 8/2000 | Mazet | 74/339 |
| 6,588,563 | B1 | * | 7/2003 | Sarrach et al. | 192/53.34 |
| 7,121,393 | B1 | * | 10/2006 | Skipper et al. | 192/48.91 |
| 7,383,931 | B2 | * | 6/2008 | Giese et al. | 192/53.341 |
| 8,342,307 | B2 | * | 1/2013 | Christoffer et al. | 192/53.34 |

FOREIGN PATENT DOCUMENTS

DE 19821565 A1 11/1999

OTHER PUBLICATIONS

International Search Report, dated Feb. 1, 2010.

* cited by examiner

*Primary Examiner* — David D Le
*Assistant Examiner* — Mark Manley
(74) *Attorney, Agent, or Firm* — Carlson, Gaskey & Olds, PC

(57) ABSTRACT

A synchronizer hub comprises a one-piece, disk-shaped base body having a longitudinal extent, an external toothing on an outer periphery of the base body, and an internal toothing on an inner periphery of the base body. The external toothing is divided into a plurality of tooth segments which, as viewed in the longitudinal extent, alternately extend from the base body in opposite directions.

20 Claims, 9 Drawing Sheets

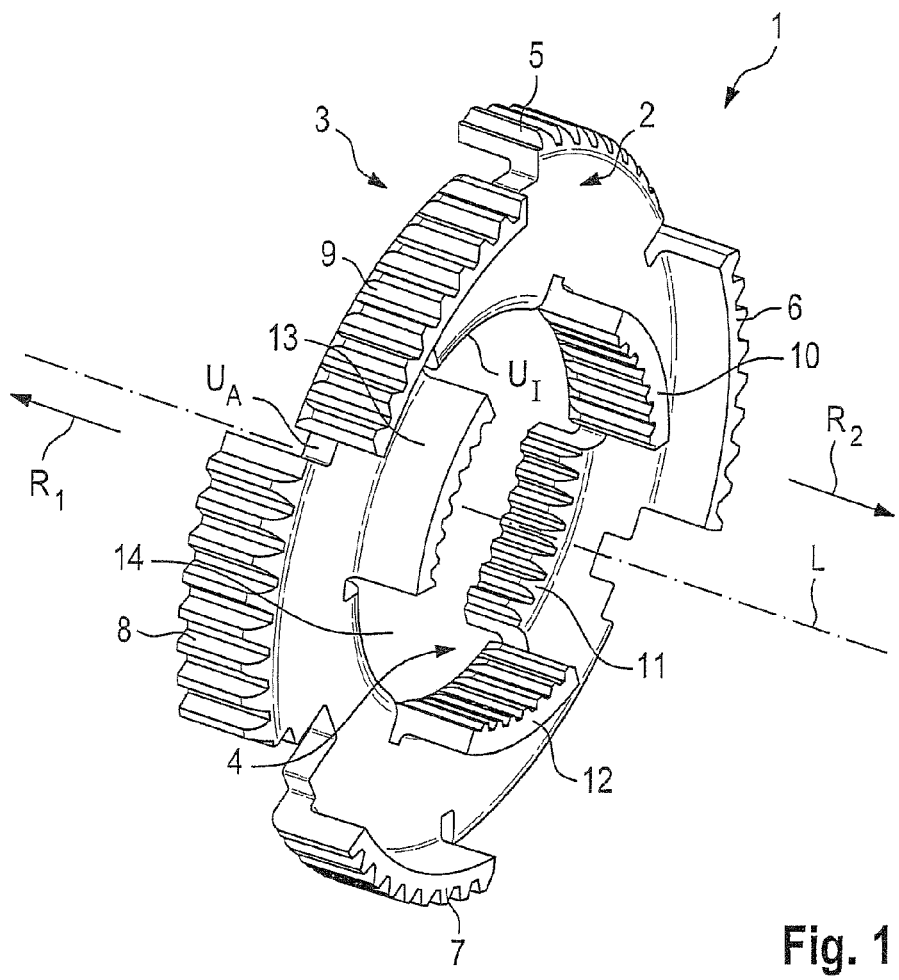
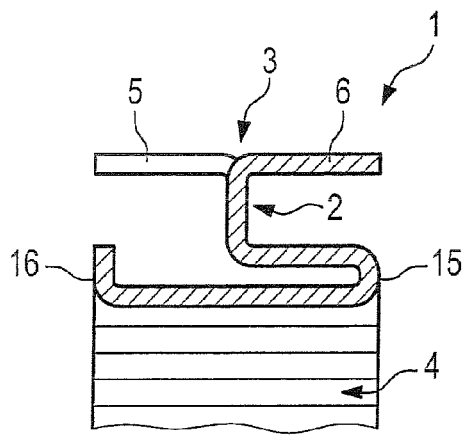
Fig. 2
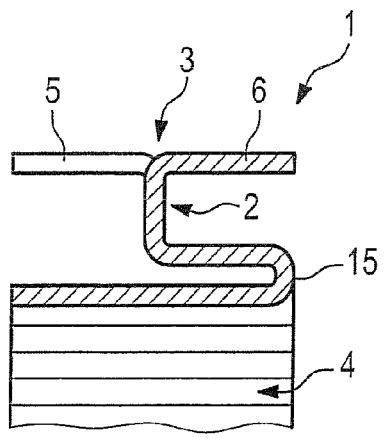
Fig. 3

US 8,607,951 B2

SYNCHRONIZER HUB

RELATED APPLICATION

This is the U.S. national phase of PCT/EP2009/007749, filed Oct. 29, 2009, which claims priority to European Application No. 08 018 880.8, filed 29 Oct. 2008.

FIELD OF THE INVENTION

The present invention relates to a synchronizer hub for a transmission.

BACKGROUND

A synchronizer hub of this type is disclosed in DE 198 21 565 A. This document describes two different solutions to a synchronizer hub, in which the synchronizer hub includes a one-piece base body which is provided with only one one-sided internal and external toothing.

In a further embodiment, the known synchronizer hub is assembled from two sections which need to be connected with each other by riveting or welding, for example, to form the synchronizer body.

Research conducted in connection with the invention has shown that only a design of such type results in an operable synchronizer hub in the transmission, with the manufacturing expenditure, however, being relatively high due to the requirement of two sections to be connected with each other, which are each provided with toothings.

A synchronizer hub is needed that has the required operability, and which is simple and cost-efficient to produce.

SUMMARY

An alternate folding of internal and/or external toothings allows one single one-piece disk-shaped base body to be used, and further ensures operable toothing to be ensured for the operation of the synchronizer hub in the transmission. Accordingly, the synchronizer hub allows gear shifting and torque transfer in a manual transmission in a functionally reliable way.

Furthermore, the advantage results that the costs for the manufacture of the synchronizer hub according to the invention are low since only one base body is required, which is made up of one single part and which allows any additional working or machining processes to be eliminated.

In one example, it is therefore possible to substitute PM (powder metallurgical) hubs or steel hubs in transmissions without having to accept a restriction of operability.

In addition to the above-mentioned toothings, the synchronizer hub also includes all other usual features, such as, more particularly, guide surfaces for receiving thrust pieces and for guiding and centering synchronizer rings.

The base body may preferably be manufactured from a sheet metal part by metal forming.

These and other features of the present invention can be best understood from the following specification and drawings, of which the following is a brief description.

BRIEF DESCRIPTION OF THE DRAWINGS

Further details, advantages and features of the invention will be apparent from the description of an exemplary embodiment below, with reference to the drawings, in which:

FIG. 1 shows a perspective illustration of a first embodiment of a synchronizer hub according to the invention;

FIG. 2 shows a simplified illustration of a second embodiment;

FIG. 3 shows an illustration, corresponding to FIG. 2, of a third embodiment;

DETAILED DESCRIPTION

Figure 4:
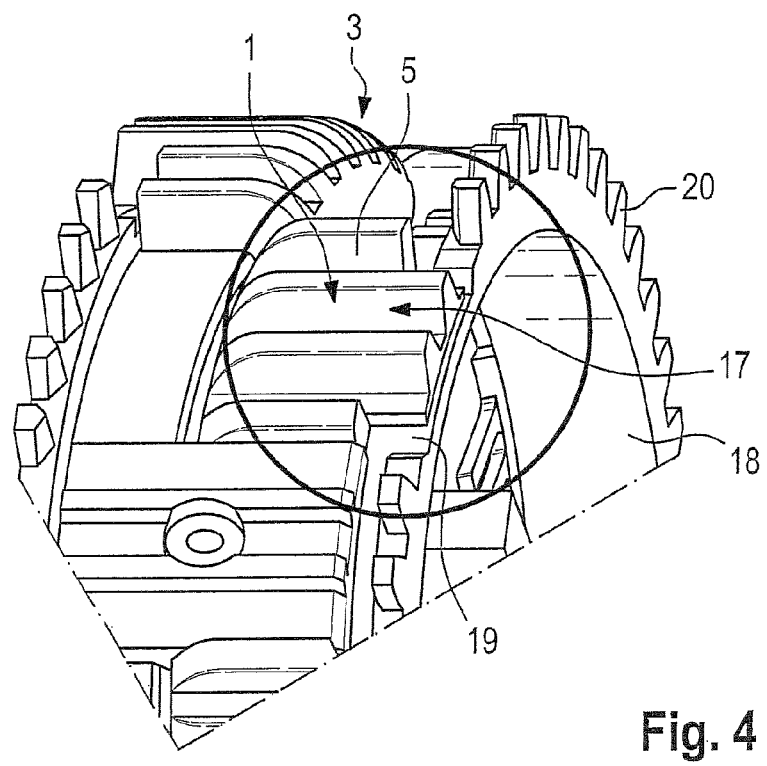
FIG. 4 shows an illustration, corresponding to FIG. 1, of a synchronizer hub with a synchronizer ring in accordance with a fourth embodiment.

FIG. 1 of the drawings shows a synchronizer hub 1 according to the invention, which includes a one-piece, disk-shaped base body 2, preferably made from a sheet metal part. The dash-dotted line L in the Figure clearly shows the longitudinal extent of the base body 2.

In the illustrated embodiment, the base body 2 is provided with an external toothing 3 on an outer periphery $U_A$, the external toothing 3 being divided into a plurality of segments. In the exemplary case, six segments are provided, of which, given the illustration chosen, five segments 5, 6, 7, 8, and 9 are visible.

The internal toothing 4 arranged on an inner periphery $U_I$ of the base body 2 also has six segments in the exemplary case, of which the segments 10, 11, 12, and 13 are visible.

As appears from the representation of the Figure, the tooth segments 5-9 and 10-13 of the external toothing 3 and of the internal toothing 4, respectively, are arranged distributed on the respective periphery $U_A$ and $U_I$. As will be further appreciated from the Figure, the tooth segments 5-9 and 10-13 each extend alternately here, in the direction R1 and in the opposite direction R2, these directions R1 and R2 extending parallel to the longitudinal extent L.

FIG. 2 shows the upper half of a further embodiment of the synchronizer hub 1 according to the invention in a greatly simplified schematic illustration. With respect to the features that correspond to those in FIG. 1, the same reference numbers have been used.

According to the view chosen in FIG. 2, the base body 2 is of a winding configuration and includes speed change gear contacts or speed change gear contact surfaces 15 and 16 on each of its two face sides.

In this embodiment the internal toothing 4 is of a one-part design and made to extend over the entire width, which results in the advantage of a high load bearing capacity.

The speed change gear contact 16 in this embodiment is of an upswept configuration parallel to the speed change gear contact 15. The embodiment according to FIG. 3 essentially corresponds to that of FIG. 2, but no upswept speed change gear contact 16 is provided.

The embodiment according to FIG. 4 shows a detail of the synchronizer hub 1 according to the invention in a perspective illustration to explain the feature of a nose 17 marked within the circle, the nose 17 being a part of the tooth segment 5 of the external toothing 3 of the synchronizer hub 1 in the exemplary case. As is shown clearly in FIG. 4, the nose 17 according to the illustration as shown in FIG. 4 is prolonged to the right with respect to the tooth segment 5 and here engages into a recess or groove 19 in the external toothing of a synchronizer ring 18, so that this embodiment permits the simple formation of an indexing. The indexing defines the limited relative rotation between the synchronizer hub 1 and the synchronizer ring 18. To this end, the dimension of the recess or groove 19, as viewed in the peripheral direction, is larger than the dimension of the nose 17. The recess or groove 19 has groove flanks which constitute stops for the nose 17 and define a locking position of the synchromesh transmission. In the middle between the stops in the peripheral direction there is a release position (illustrated in FIG. 4), in which a shifting sleeve 30 can be axially slid from toothing 20 of the synchronizer ring 18 onto a speed change gear 32 unhindered (cf. FIG. 11).

In addition, the radially inner face of the nose 17 constitutes a contact surface for the synchronizer ring 18, more precisely the radially outer face of the recess or groove 19 of the synchronizer ring 18. If a plurality of noses 17, preferably at least three, is arranged distributed over the periphery, each engaging into an associated recess or groove 19, this results in a centering of the synchronizer ring 18, i.e. a concentric arrangement of the synchronizer ring 18 in relation to the synchronizer hub 1. Any undesirable clattering or rattling noises as caused by radial movements of the synchronizer ring 18 are thereby reduced or, ideally, prevented altogether.

Figure 5:
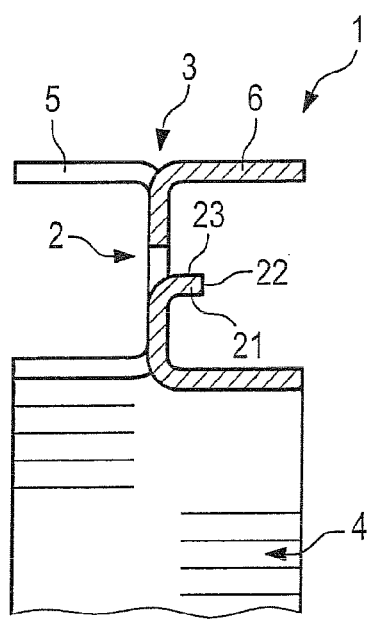
FIG. 5 shows an illustration, corresponding to FIG. 2, of a fifth embodiment.

FIG. 5, in an illustration again corresponding to FIG. 2, shows the synchronizer hub 1, which in this embodiment comprises a nose 21 folded out of the base body 2 and including a speed change gear contact surface 22 on its front face and a thrust piece support surface 23 on the upper side facing the external toothing 3.

Figure 6A:
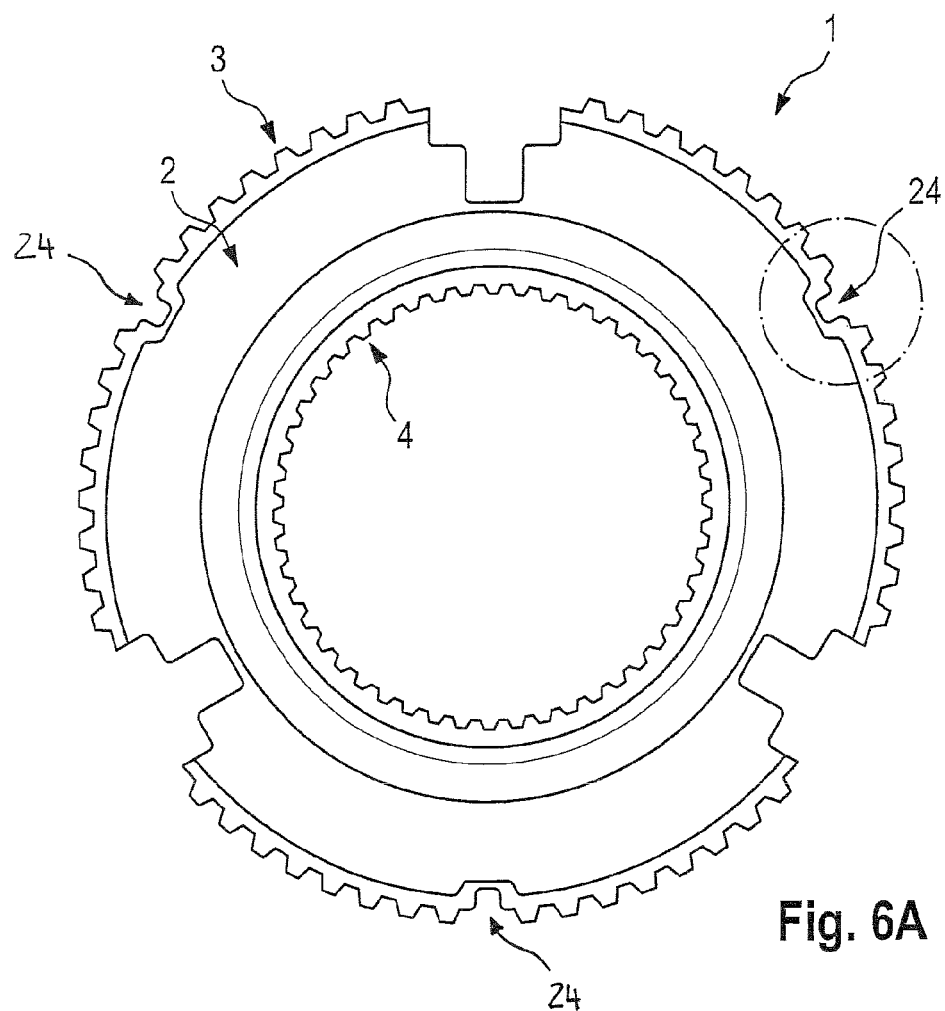
FIG. 6A shows a first view of a sixth embodiment.
Figure 6B:
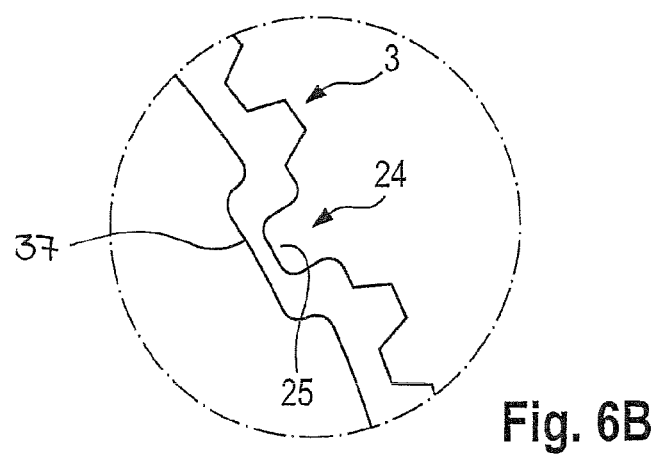
FIG. 6B shows a second view of a sixth embodiment.

The embodiments according to FIGS. 6A and 6B clearly show the option of a centering feature 24, illustrated on a larger scale in FIG. 6B, which corresponds to the circled area of FIG. 6A. Here, too, the centering feature 24 denotes a concentric orientation of the synchronizer ring 18 relative to the synchronizer hub 1. It will be appreciated herefrom that the centering feature 24 may be provided in the form of an indentation 25 or an embossing which in this embodiment results in a U-shaped depression in the external toothing 3, as is apparent more particularly from the detail view of FIG. 6B, to which reference is explicitly made hereby. Radial inner faces 37 of the three indentations 25 on the synchronizer hub 1, distributed over the periphery, here define contact surfaces for the adjacent synchronizer ring 18 and prevent radial movements of the synchronizer ring 18 in relation to the synchronizer hub 1.

Figure 7:
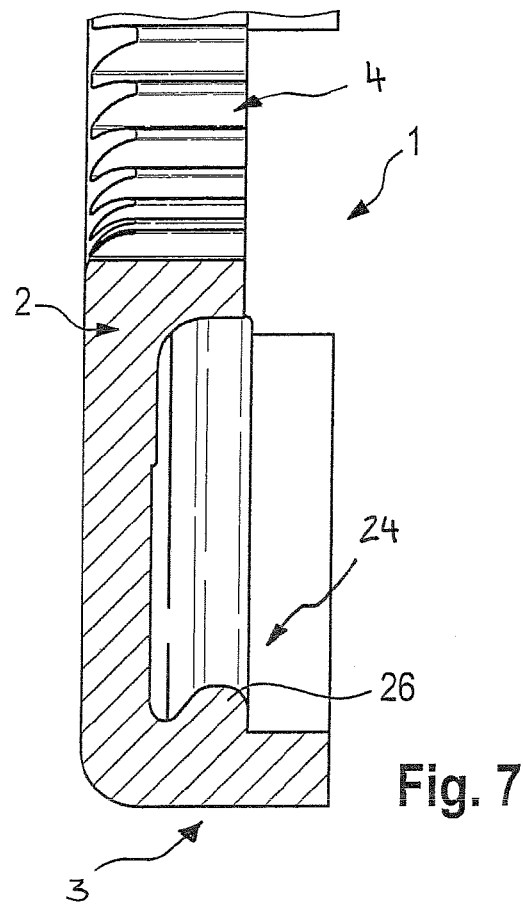
FIG. 7 shows a first sectional view of part of the synchronizer hub according to a seventh embodiment of the invention.
Figure 8:
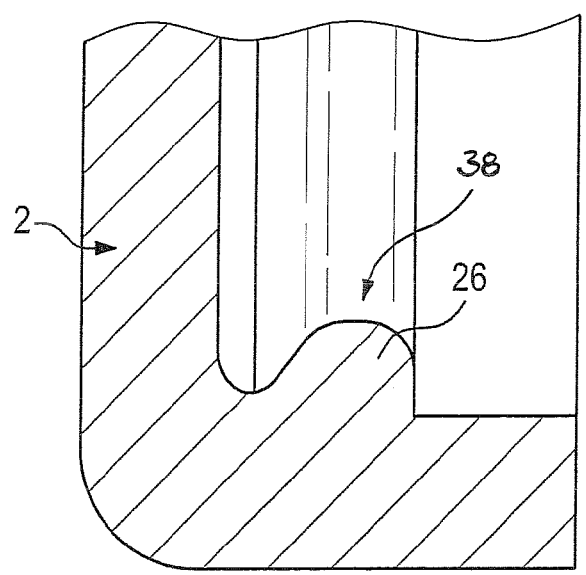
FIG. 8 shows a second sectional view of part of the synchronizer hub according to a seventh embodiment of the invention.

FIGS. 7 and 8 show details of a further embodiment of the synchronizer hub 1 according to the invention, which in this embodiment has a base body 2 that is provided with a centering feature in the form of a slide-on collar 26. Analogous to the previous embodiment, a radial inner face 38 defines the contact surface for the adjacent synchronizer ring 18 in this case too, so that the collar 26 aligns the synchronizer ring 18 concentrically with the synchronizer hub 1.

Figure 9:
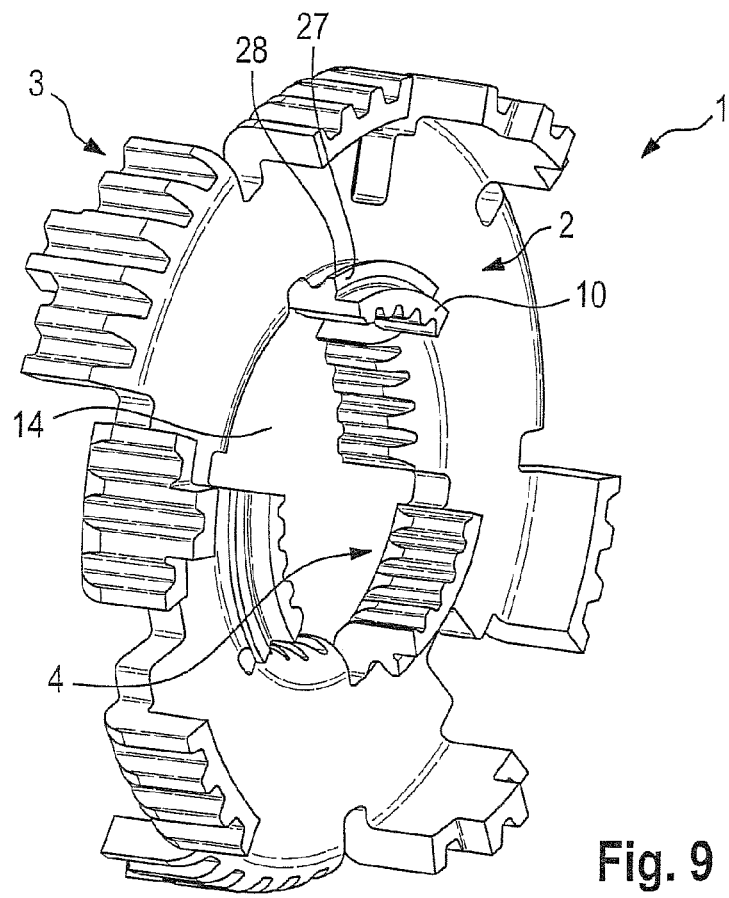
FIG. 9 shows an illustration, corresponding to FIG. 1, of an eighth embodiment of the synchronizer hub according to the invention.

FIG. 9 shows an embodiment of the synchronizer hub 1 according to the invention in an illustration corresponding to FIG. 1. This embodiment includes an external toothing 3 and an internal toothing 4, which are each of a segmented configuration.

Using the tooth segment 10 of the internal toothing 4 as an example, providing a collar 28 on the upper side, facing the external toothing 3, of the tooth segment 10 is illustrated. This thrust-on or slide-on collar 28 has a speed change gear contact surface 27 on its front face. Otherwise, with respect to this embodiment, reference may be made to the explanations relating to FIG. 1.

Figure 10:
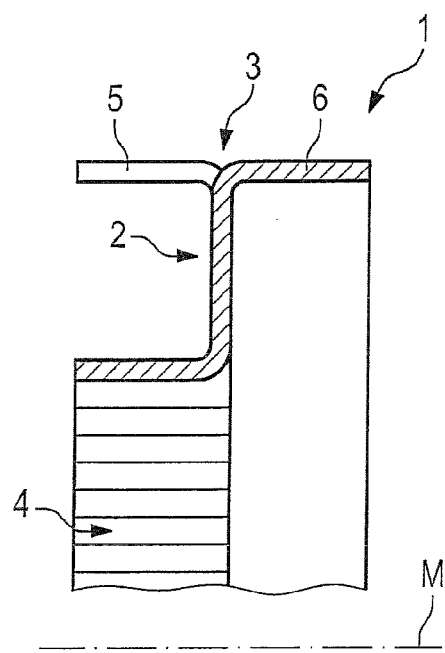
FIG. 10 shows an illustration, corresponding to FIG. 2, of a ninth embodiment of the synchronizer hub according to the invention.

Finally, FIG. 10 clearly illustrates a further, greatly simplified schematic representation of the synchronizer hub 1 corresponding to FIG. 2, in which only the area located above a center line M is shown. In this embodiment, the synchronizer hub 1 again includes a segmented external toothing 3 having folded over tooth segments 5 and 6, which are visible in FIG. 10.

The internal toothing 4 is not of a segmented configuration and extends from the base body 2 to one side only, in this case the side of the tooth segment 5, and thus constitutes an alternative in this regard to the embodiments according to FIGS. 2 and 3, in which the internal toothing 4 extends over the entire width of the tooth segments 5 and 6.

Figure 11:
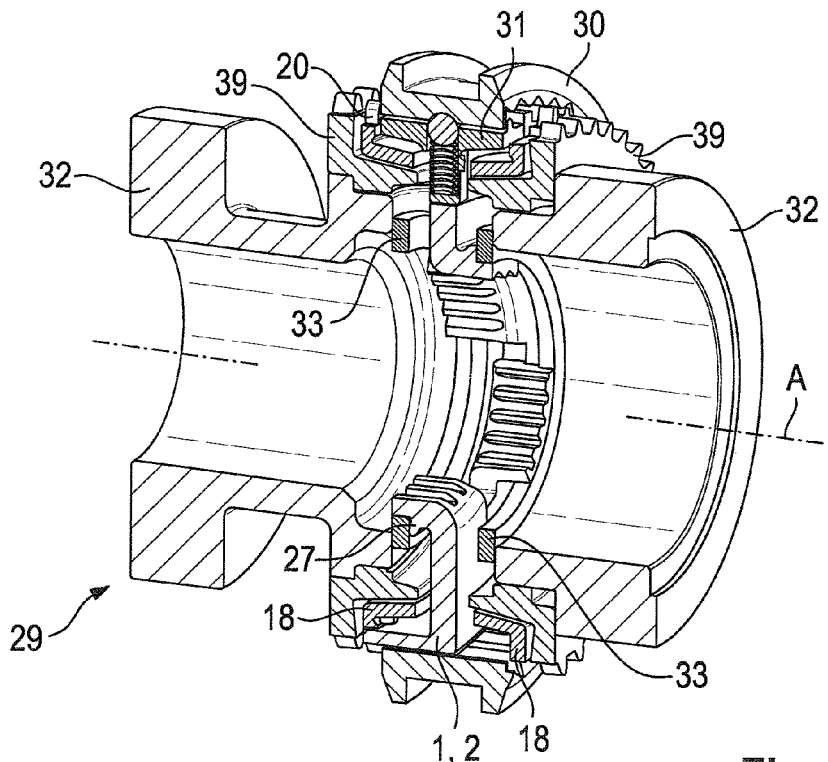
FIG. 11 shows a perspective sectional view of a manual transmission with the synchronizer hub according to the invention, from FIG. 9.

FIG. 11 shows a perspective sectional view of a manual transmission 29 for vehicles, having a synchronizer hub 1 according to FIG. 9. The synchronizer hub 1 is rotatable about a transmission axis A (which is identical with the longitudinal extent L) and connected to an axially displaceable shifting sleeve 30 so as to be non-rotatable relative thereto. As is usual for manual transmissions 29 with a synchronization, a plurality of thrust pieces 31 is provided between the shifting sleeve 30 and the synchronizer hub 1, distributed over the periphery, one such thrust piece 31 being illustrated in FIG. 11. The manual transmission 29 includes one respective synchronizer ring 18 and one respective speed change gear 32 on either side of the synchronizer hub 1. In the present case, the speed change gear 32 is of a two-part structure and includes a separate selector teeth section 39 that is firmly connected with the speed change gear 32. The selector teeth section 39 serves as a clutch body between the shifting sleeve 30 and the actual speed change gear 32. As an alternative, the selector teeth section 39 may also be an integral component of the speed change gear 32.

In order to ensure a desired distance between the synchronizer hub 1 and the speed change gear 32, one spacer ring 33 is provided for each gear, which is axially adjacent to the speed change gear contact surface 27 (cf. also FIG. 9), on the one hand, and to the speed change gear 32, on the other hand.

Figure 12:
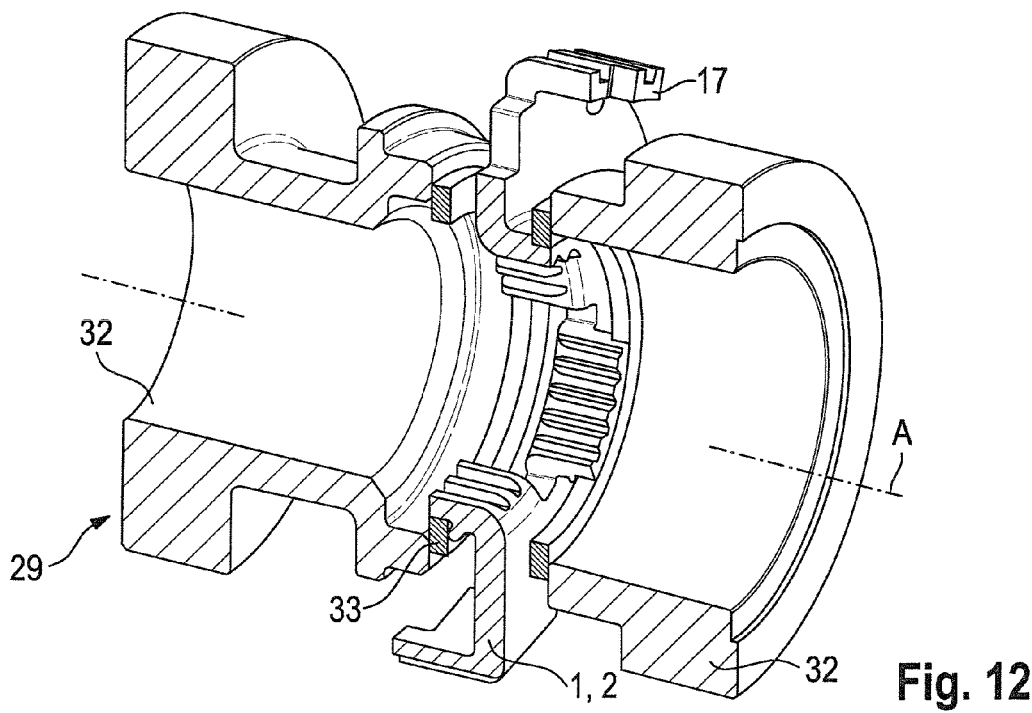
FIG. 12 shows a further perspective sectional view of the manual transmission according to FIG. 11.

FIG. 12 only illustrates the synchronizer hub 1, the spacer rings 33, and the speed change gears 32, with the right-hand speed change gear 32 being shown transparent to allow the geometry and arrangement of the individual parts to be seen more clearly.

Figure 13:
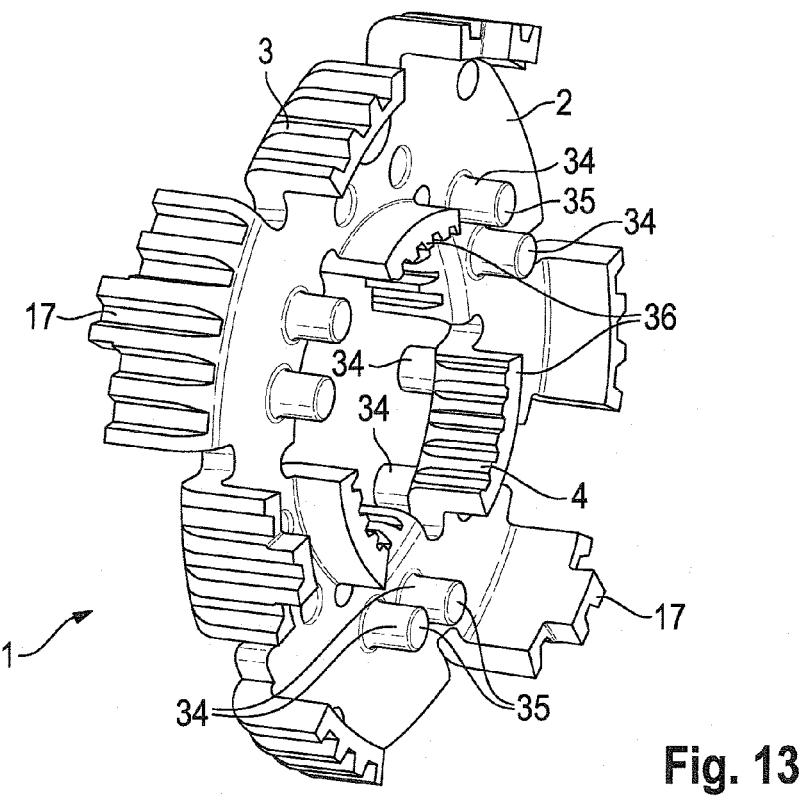
FIG. 13 shows an illustration, corresponding to FIG. 1, of a tenth embodiment of the synchronizer hub according to the invention.

FIG. 13 shows the synchronizer hub 1 according to a tenth embodiment, which differs from the eighth embodiment according to FIG. 9 merely in that no collar 28 is provided, but, instead, axial spacer elements 34 are provided. In the illustrated exemplary embodiment, the spacer elements 34 are cylindrical extensions which are formed integrally with the base body 2, in particular by embossing.

Figure 14:
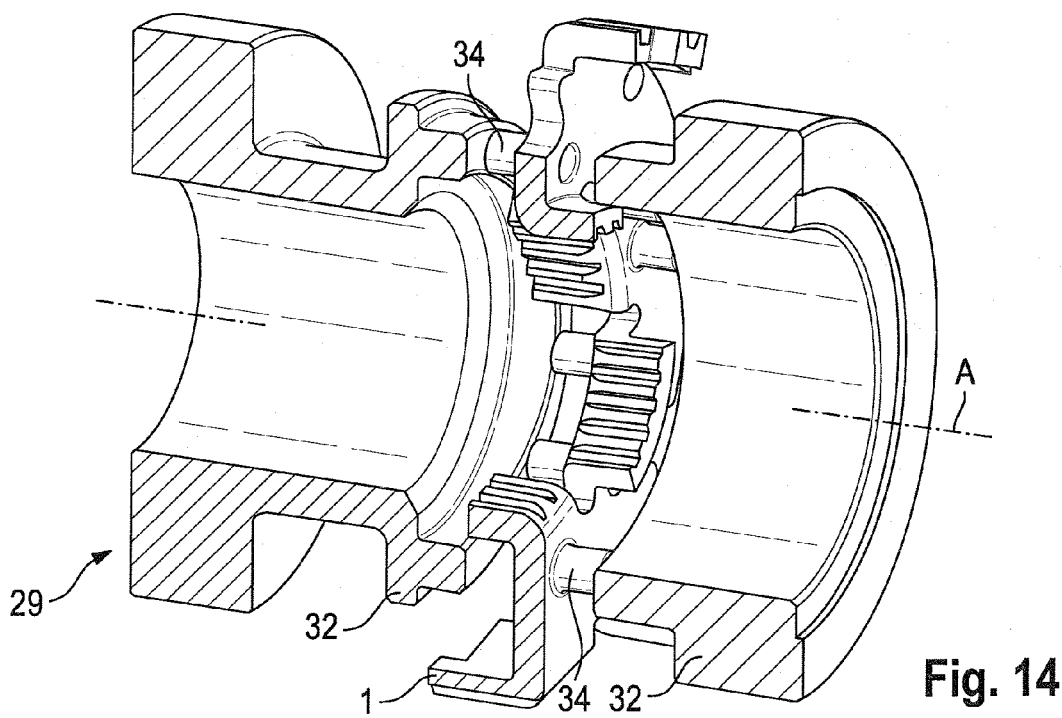
FIG. 14 shows a perspective sectional view of a manual transmission with the synchronizer hub according to the invention, from FIG. 13.

In the installed condition of the synchronizer hub 1 (cf. FIG. 14), the spacer elements 34, more precisely an axial front face 35 of the spacer elements 34, constitute contact surfaces for each speed change gear 32. Viewed from the base body 2, the axial dimension of the tooth segments 10-13 of the internal toothing 4 substantially corresponds to the axial dimension of the spacer elements 34, so that front faces 36 of the tooth segments 10-13 may additionally also each constitute contact surfaces for the speed change gear 32. To form a contact surface that is as continuous as possible in the peripheral direction, the spacer elements 34 are arranged distributed over the periphery of the base body 2, with two spacer elements 34 each being provided by way of example on the peripheral portion of each tooth segment 10-13 of the internal toothing 4, and the respective tooth segment 10-13 and the two associated spacer elements 34 extending from the base body 2 in opposite directions R1, R2. As a result of the contact surface for the speed change gear 32 as constituted by the front faces 35 and possibly 36, the separate spacer rings 33 illustrated in FIGS. 11 and 12 may be eliminated. This reduces the number of individual parts, lowers the manufacturing costs, and also simplifies the assembly of the manual transmission 29. In addition, the contact—interrupted in the peripheral direction—with the spacer elements 34, and the omission of the continuously surrounding spacer rings 33 allow an oil flow in the radial direction without oil grooves having to be provided in the speed change gears 32. This contributes to a further reduction in manufacturing costs.

Figure 15:
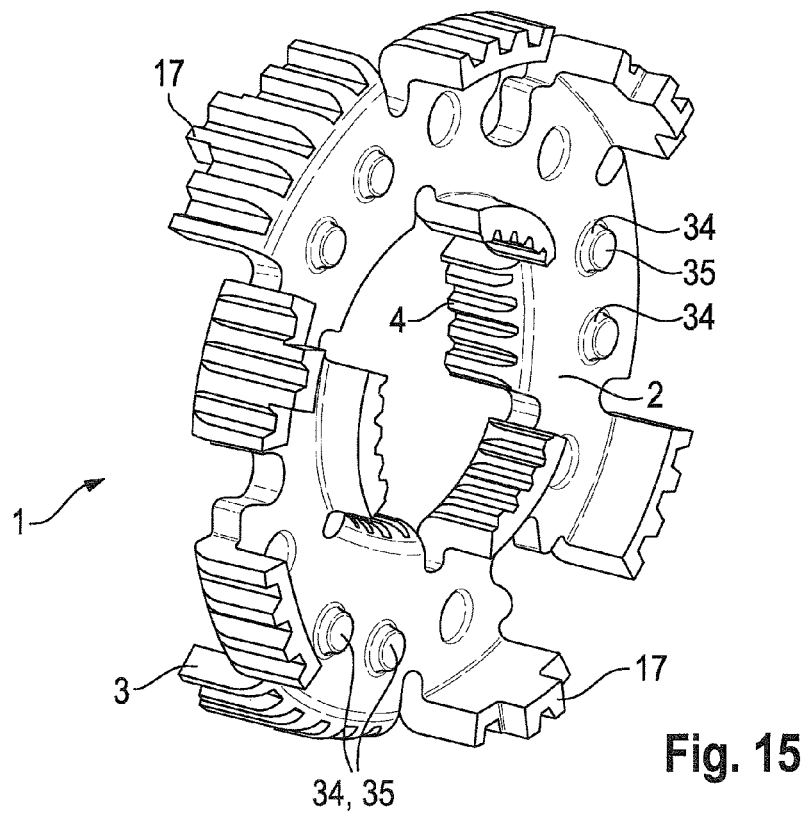
FIG. 15 shows an illustration, corresponding to FIG. 1, of an eleventh embodiment of the synchronizer hub according to the invention.
Figure 16:
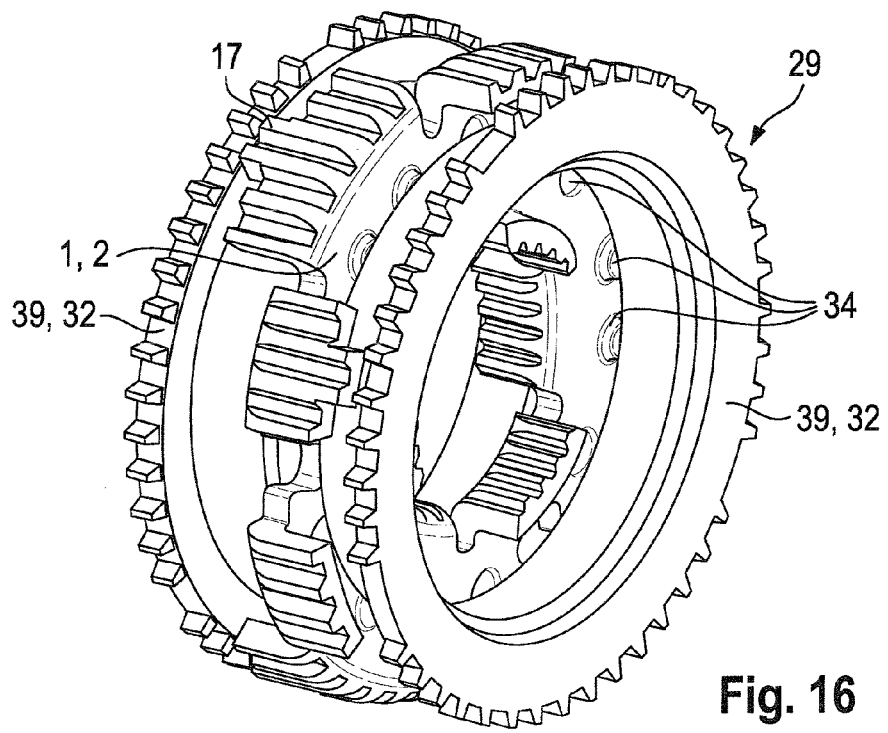
FIG. 16 shows a perspective sectional view of a manual transmission with the synchronizer hub according to the invention, from FIG. 15.

FIG. 15 shows the synchronizer hub 1 according to an eleventh embodiment, which differs from the tenth embodiment according to FIG. 13 only in that, as viewed from the base body 2, the axial dimension of the spacer elements 34 is smaller than the axial dimension of the tooth segments 10-13 of the internal toothing 4 and that the spacer elements 34 are arranged further on the outside. As a result, the projections 34 define contact surfaces for the selector teeth section 39 of the speed change gear 32 in the installed condition of the synchronizer hub 1 (cf. also FIG. 11). This is illustrated in FIG. 16, with the front or right-hand selector teeth section 39 being shown transparent.

Figure 17:
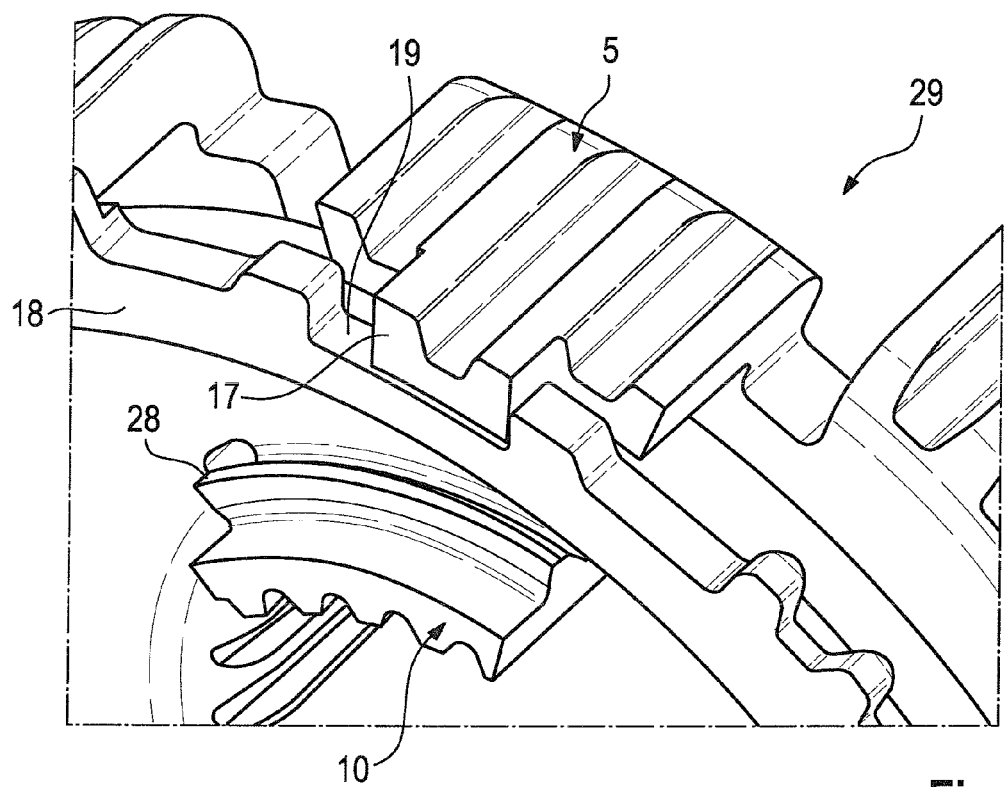
FIG. 17 shows a detail of a manual transmission with a synchronizer hub according to the invention.

Analogous to FIG. 4, FIG. 17 shows a detail of the manual transmission 29 in the area of the nose 17. This nose 17 is formed as an axial protrusion on one or more tooth segments 5-9 of the external toothing 3 and engages into the recess or groove of the adjacent synchronizer ring 18.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A synchronizer hub, comprising
a one-piece, disk-shaped base body rotatable about an axis and having a longitudinal extent;
an external toothing on an outer periphery of the base body, the external toothing being divided into a plurality of external tooth segments wherein each segment extends from the base body only in the opposite longitudinal direction relative to adjacent segments and wherein each external tooth segment is comprised of a plurality of external teeth extending radially outward away from the axis; and
an internal toothing on an inner periphery of the base body.

2. The synchronizer hub according to claim 1, wherein the base body is configured to synchronize speeds between a gear and a component to be connected to the gear.

3. The synchronizer hub according to claim 1, wherein the internal toothing is divided into a plurality of internal tooth segments which, as viewed in the longitudinal extent, alternately extend from the base body in opposite directions, and wherein each internal tooth segment is comprised of a plurality of internal teeth extending radially inward toward the axis.

4. The synchronizer hub according to claim 1, wherein the base body comprises a sheet metal part.

5. The synchronizer hub according to claim 1, wherein the base body is provided with speed change gear contacts.

6. The synchronizer hub according to claim 1, wherein the base body includes a folded-out nose having a speed change gear contact surface and a thrust piece support surface.

7. The synchronizer hub according to claim 1, wherein the base body is provided with a centering feature comprising an indentation.

8. The synchronizer hub according to claim 1, wherein the base body is provided with a centering feature comprising a collar.

9. The synchronizer hub according to claim 1, wherein at least one internal tooth segment is provided with a collar having a speed change gear contact surface on a front face thereof.

10. The synchronizer hub according to claim 1, wherein a nose is provided as part of an external tooth segment, the nose extending in the longitudinal extent and being adapted to engage in a recess or groove of an external toothing of a synchronizer ring.

11. The synchronizer hub according to claim 1, wherein the base body includes axial spacer elements which constitute contact surfaces for a speed change gear in an installed condition of the synchronizer hub.

12. The synchronizer hub according to claim 11, wherein the spacer elements are formed integrally with the base body.

13. The synchronizer hub according to claim 11, wherein the spacer elements are arranged distributed over a periphery of the base body, with at least one internal tooth segment and at least one spacer element extending from the base body in opposite directions.

14. The synchronizer hub according to claim 11, wherein as viewed from the base body, an axial dimension of the internal tooth segments substantially corresponds to an axial dimension of the spacer elements.

15. The synchronizer hub according to claim 14, wherein axial front faces of the spacer elements and/or axial front faces of the internal tooth segments constitute contact surfaces for a speed change gear in the installed condition of the synchronizer hub.

16. The synchronizer hub according to claim 11, wherein as viewed from the base body, an axial dimension of the spacer elements is smaller than an axial dimension of the internal tooth segments.

17. The synchronizer hub according to claim 16, wherein axial front faces of the spacer elements constitute contact surfaces for a selector teeth section of the speed change gear in the installed condition of the synchronizer hub.

18. A manual transmission for a vehicle, comprising:
a synchronizer hub comprising a one-piece, disk-shaped base body rotatable about an axis and having a longitudinal extent, an external toothing on an outer periphery of the base body, and an internal toothing on an inner periphery of the base body the external toothing being divided into a plurality of external tooth segments wherein each segment extends from the base body only in the opposite longitudinal direction relative to adjacent segments and wherein each external tooth segment is comprised of a plurality of external teeth extending radially outward away, from the axis;
at least one synchronizer ring; at least one speed change gear; and
spacer elements integrally formed with the synchronizer hub and having contact surfaces for the at least one speed change gear.

19. The manual transmission according to claim 18, wherein the internal toothing is divided into a plurality of internal tooth segments which, as viewed in the longitudinal extent, alternately extend from the base body in opposite directions, and wherein each internal tooth segment is comprised of a plurality of internal teeth that extend radially inward toward the axis.

20. The manual transmission according to claim 18, wherein the synchronizer hub synchronizes speeds between the gear and a component to be connected to the gear.

* * * * *